Sept. 15, 1931. F. ACKERMAN 1,823,077
STEAM TRAP
Filed Jan. 20, 1930 3 Sheets-Sheet 1
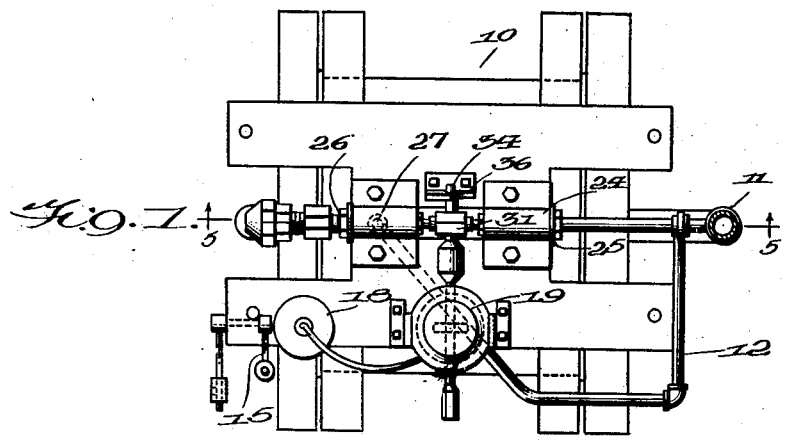
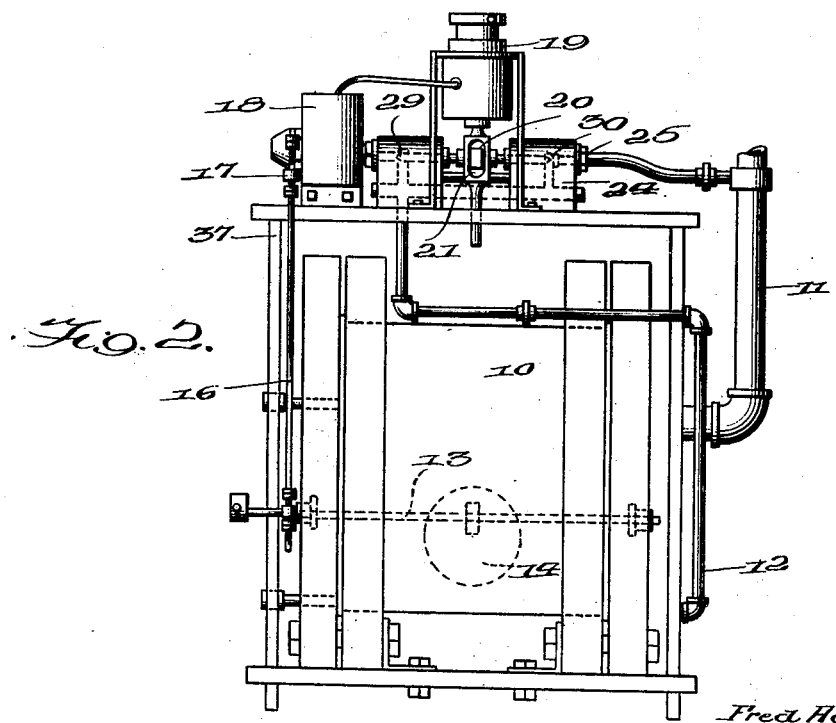
Inventor
Fred Ackerman,
By Emery, Booth, Varney & Holcomb
Attorney Sept. 15, 1931.   F. ACKERMAN   1,823,077
STEAM TRAP
Filed Jan. 20, 1930   3 Sheets-Sheet 2
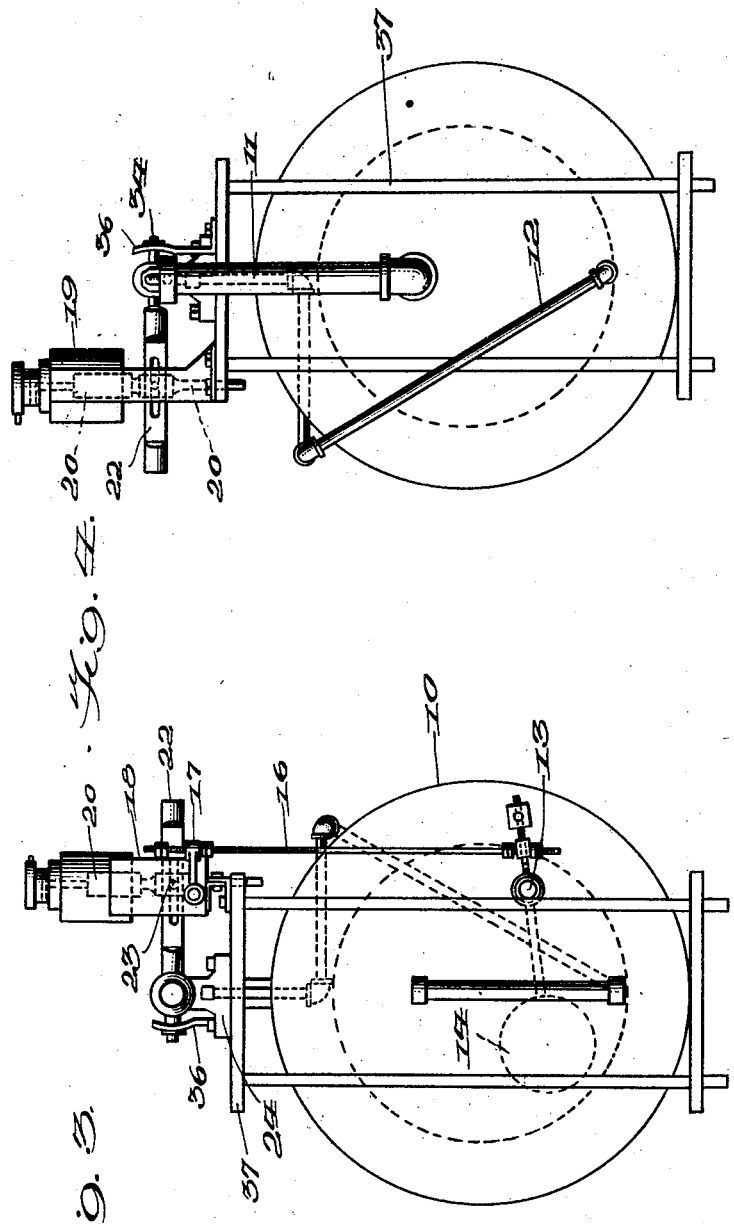

Sept. 15, 1931.   F. ACKERMAN   1,823,077
STEAM TRAP
Filed Jan. 20, 1930   3 Sheets-Sheet 3
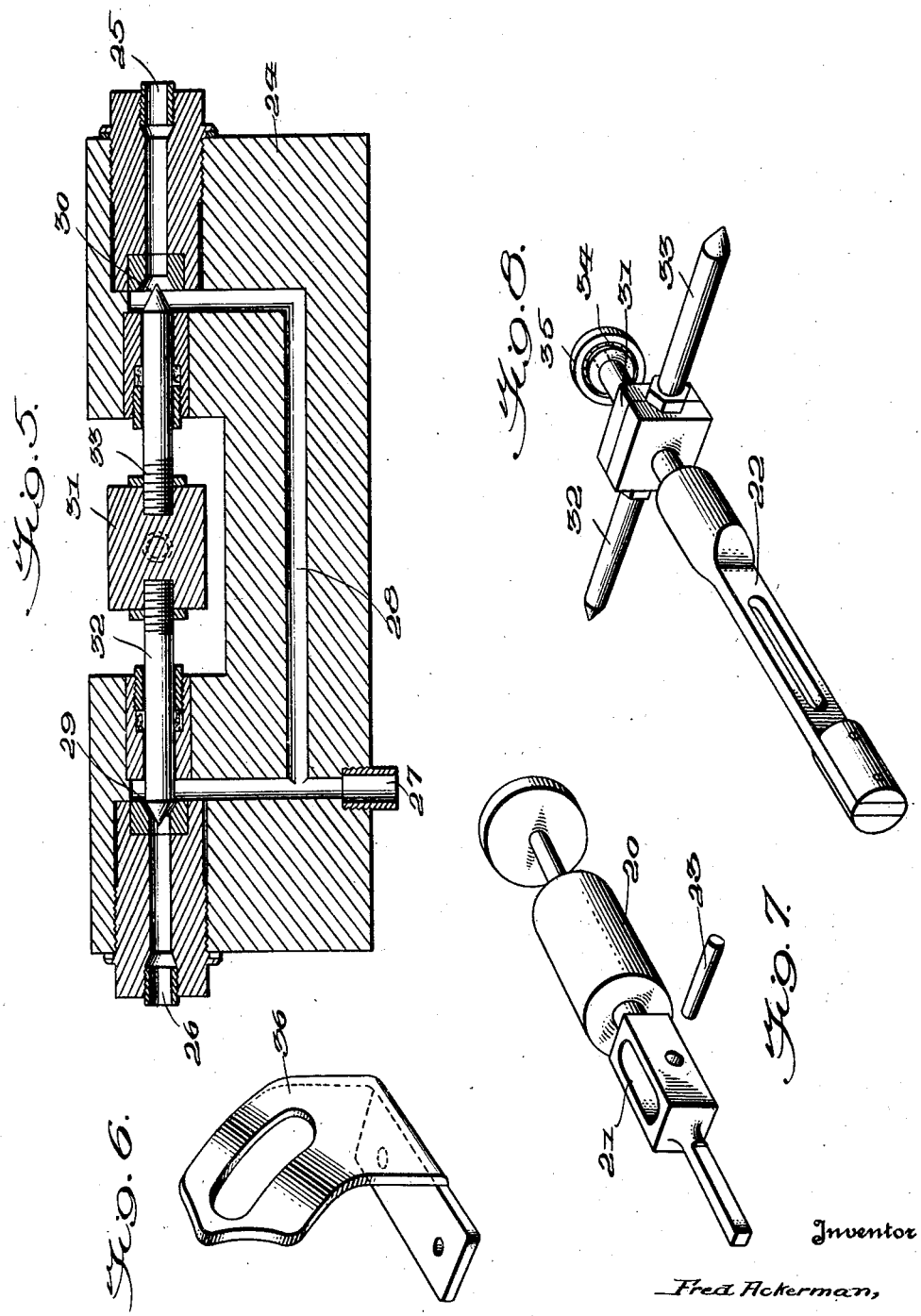
Inventor
Fred Ackerman,
By Emery, Booth, Varney & Holcombe
Attorney Patented Sept. 15, 1931

1,823,077

UNITED STATES PATENT OFFICE

FRED ACKERMAN, OF PINEVILLE, KENTUCKY; SOPHIE ACKERMAN, ADMINISTRATRIX OF SAID FRED ACKERMAN, DECEASED, ASSIGNOR OF THREE-FIFTHS TO KENTUCKY UTILITIES COMPANY, OF LOUISVILLE, KENTUCKY, A CORPORATION OF KENTUCKY

STEAM TRAP

Application filed January 20, 1930. Serial No. 422,143.

This invention relates to improvements in steam traps generally and more particularly to improvements in valve construction, actuation and control. The invention aims to improve the efficiency and serviceability of devices of this nature.

Further objects and advantages of the invention appear in the following description of a preferred embodiment illustrated in the accompanying drawings, wherein:

Fig. 1 is a top plan view of a steam trap showing the valve block and actuating means;

Fig. 2 is a side elevation showing the tank with its inlets and outlet, and general arrangement of the float control rods, electrical switch and valve actuating means for automatically operating the valves;

Figs. 3 and 4 are opposite end views, showing more fully the arrangement and location of the various parts;

Fig. 5 is an enlarged longitudinal vertical section of the valve U-shaped block taken on the line 5—5 in Fig. 1, showing one valve closed and the other open as in the normal filling operation of the trap;

Fig. 6 is a perspective view of the cam controlling the movements of the valves;

Fig. 7 is a perspective view of the plunger of the solenoid which operates the valve actuating lever, and Fig. 8 is a perspective view of the block carrying the valve stems, the slotted valve actuating lever and the cam engaging roller and bearing.

The apparatus shown in the drawings comprises a condensation tank 10 having an inlet pipe 11 leading from the steam line to be drained, and a discharge pipe 12. Journaled in and extending through the end walls of the tank as shown in Fig. 2 is a support 13 for the arm of the float 14. Secured on one end of the support 13 is a lever 15 which is loosely connected to the lower end of the vertical connecting rod 16, the upper end of the connecting rod being also loosely connected with a switch arm 17 of a suitable electrical switch 18. This switch is in an electrical circuit that controls the movement of a solenoid 19.

The plunger 20 of the solenoid (see Figs. 2, 3, 4, and 7) has an opening 21 therethrough to receive the slotted valve actuating arm 22. (See Fig. 8.) At right angles to and in the walls of the opening 21 are holes to receive a pin 23 which passes through and controls the movement of the valve actuating arm 22.

As best shown in Fig. 5 the valve member is composed of a block 24 with a pressure equalizing inlet port 25, a discharge port 26 and a port 27 connecting with the discharge pipe 12 of the tank 10. The passage 28 is provided to allow the pressure entering at the port 25 to prevent water from reaching the discharge valve 29 when closed. A valve 30 is located at the opposite end of the block 24 to cut off pressure through port 25 during discharge. The alternate opening and closing of the valves is accomplished simultaneously by the provision of a common base block 31 for supporting the valve stems 32 and 33 which are adjustably mounted in the block 31.

Extending from the block 31 at right angles to the valve stems are the valve actuating arm 22 and the cam engaging roller 35, mounted on the ball bearing 34. This roller 35 works in a cam slot formed in a member 36 (see Fig. 6) secured to the frame 37 which supports the tank and valve apparatus.

In operation, the steam or mixture of water and steam enters the tank through the pipe 11 and is condensed therein. To prevent the steam pressure from prematurely forcing water through the valve 29, the inlet 25 and passage 28 allow incoming steam to equalize pressure in the tank. Accumulation of water raises the float and through the connecting rod and switch actuates the solenoid plunger which in turn moves the valve actuating arm 22. The roller 34 working in its cam slot transforms the vertical motion of the actuating arm into horizontal motion of the valve block 31 with a resulting opening of the discharge valve 29 and closing of the inlet valve 30. Steam pressure in the system empties the tank and the float returns to its original position, causing the solenoid or similar device to return the valve member to its normal filling position.

Location of all of the working parts outside of the tank is an advantageous feature, making the parts accessible at all times for maintenance and repair, while the mounting of the two valve stems in the single base block assures perfect coordination. The valve stems and the connecting rod 16 may be adjusted to suit the conditions of use.

Obviously the invention is not limited to the details shown and described.

I claim:

1. A steam trap comprising a tank having inlet and outlet ports, a float within the tank, a pivotal float support extending outside the tank, valve means for controlling the inlet and outlet ports comprising a valve block outside of the tank having oppositely disposed valve stems, a common intermediate base for adjustably mounting the stems, and connections between the float support and valve means.

2. In a steam trap comprising a tank having inlet and outlet ports, valve means controlling the inlet and outlet ports comprising an oscillating valve block, sliding valve stems and a common base for adjustably mounting the stems, means for reciprocating the base and stems, comprising a power device having a reciprocating member, an arm mounted in the base, and connected to said reciprocating member, a follower extending from the base, a cam engaging the follower, and connections between the power device and tank for actuating the power device when the water rises to a predetermined point.

3. In a steam trap comprising a tank having inlet and outlet ports, valve means outside of the tank controlling the inlet and outlet ports, and connections for operating said valve means comprising a lever responsive to the water level in the tank, a switch and circuit connections, a rod between the said lever and switch, a solenoid in said circuit having a movable plunger and a cam controlled power transmitting and valve actuating arm connected to said plunger.

4. A steam trap comprising a tank having inlet and outlet ports, a float within the tank, a pivotal float support extending outside of the tank, valve means outside of the tank comprising a U-shaped block having a discharge valve and a pressure equalizing valve, and connections between the float support and valve operating means.

5. A steam trap comprising a tank having inlet and outlet pipes, said outlet pipe extending from near the bottom of said tank, a valve in said outlet pipe above the water level in said tank, a bypass pipe from said inlet pipe to said outlet pipe below said valve, a second valve in said bypass pipe, a movable valve member having valve controlling means adapted to close one of said valves and open the other, and means for actuating said movable valve member responsive to changes in the water level.

6. A steam trap comprising a tank having inlet and outlet pipes, said outlet pipe extending from near the bottom of said tank, a valve in said outlet pipe above the water level in said tank, a bypass pipe from said inlet pipe to said outlet pipe below said valve, a second valve in said bypass pipe, a movable valve member having valve controlling means adapted to close one of said valves and open the other, and means for actuating said movable valve member responsive to changes in the water level, said last named means including electrical circuit connections and a switch therefor.

7. A steam trap comprising a tank having inlet and outlet ports, a shaft journalled within said tank, one end of said shaft extending through a side wall of the tank, a float within the tank mounted on said shaft, a valve in said outlet pipe, a bypass from the inlet pipe leading to the outlet pipe, a reciprocating double valve in the bypass, a reciprocating double valve member, means for reciprocating said valve member to control valves comprising valve member, an oscillating arm, and a cam engaging follower on said arm for causing reciprocation of said valve member.

8. In a steam trap having a tank with inlet and outlet ports, valve means controlling said ports comprising a U-shaped valve block, valve seats in the vertical extensions of said block, horizontal valve stems mounted in a support intermediate of said vertical extensions, and means controlling the operation of said valves.

In testimony whereof, I have signed my name to this specification.

FRED ACKERMAN.